UNITED STATES PATENT OFFICE.

ROBERT A. FISHER, OF PHILADELPHIA, PENNSYLVANIA, ASSIGNOR TO HARRISON-BROTHERS & CO., OF SAME PLACE.

PREPARING A SIZING MATERIAL USED BY PAPER-MAKERS.

SPECIFICATION forming part of Letters Patent No. 223,442, dated January 13, 1880.

Application filed June 21, 1879.

*To all whom it may concern:*

Be it known that I, ROBERT A. FISHER, of the city and county of Philadelphia, and State of Pennsylvania, have invented a new and Improved Method of Preparing a Sizing Material Used by Paper-Makers, which material consists, essentially, of sulphate of alumina and sulphate of zinc.

The object of my invention is to produce a resulting product so neutral that a moderately-concentrated solution of the material produces little, if any, effect upon the pigments known as "ultramarine-blue" and "orange-mineral," or upon the various aniline colors used in paper-making.

The following description will enable any one skilled in the art to which my invention most nearly appertains to successfully carry out the process.

I first prepare a solution of sulphate of alumina by the action of sulphuric acid upon alumina, kaolin, or other aluminous substance free from iron, following the ordinary method required for the particular clay or aluminous material employed.

The relative proportions of aluminous material and sulphuric acid required and the time and temperature necessary to produce most economically the solution of sulphate of alumina will vary more or less with every variety of aluminous material, and can be determined accurately only by experiment. It may be stated, in general terms, that one part of the aluminous material will require about two parts, by weight, of sulphuric acid of density 50° Baumé.

My invention does not, however, consist in any improvement in the preparation of solutions of sulphate of alumina, but in the subsequent treatment of such solutions obtained by any of the ordinary methods.

After the preparation of the sulphate-of-alumina solution it is allowed to settle. The clear liquor, having a density of 25° Baumé, more or less, is then drawn off into a suitable vessel for subsequent treatment. (A wooden vessel lined with lead, and furnished with a metallic worm or coil, with proper appliances for passing through it a current of steam, answers the purpose well.) The solution is then heated to the temperature of 100° Fahrenheit, more or less, after which oxide of zinc, either in its dry state or moistened with water, is introduced, and the liquid stirred until all, or nearly all, of the oxide of zinc has dissolved.

The quantity of oxide of zinc necessary to produce a solution of the required neutrality will depend upon the proportion of acid contained in the sulphate-of-alumina solution.

In some cases a quantity of oxide of zinc equal in weight to two (2) per cent. of the weight of the resulting zinc sulphate of alumina, or even less, might suffice. A very much larger quantity might be necessary if the original solution of sulphate of alumina should contain much free acid.

A convenient method of determining whether a sufficient quantity of oxide of zinc has been used is by observing the action of the zinc-alumina solution upon the pigment known as "artificial ultramarine-blue." For this purpose into a glass stoppered bottle or other convenient vessel are put a few ounces of the solution previously reduced with water to density of 12° Baumé, more or less, and brought to the temperature of 60° Fahrenheit. A few grains (two to five, according to the amount of the liquid used) of finely-ground ultramarine-blue are then introduced, and the contents of the bottle shaken. If a sufficient quantity of oxide of zinc has been employed the color of the ultramarine-blue remains for a long time unaltered. If, on the contrary, the color of the pigment is soon changed or disappears, more oxide of zinc must be added to the zinc-alumina solution contained in the lead-lined tank, and after a few minutes stirring the liquid is again tested, as before, with ultramarine-blue. These alternate operations of adding oxide of zinc and testing the resulting liquid with ultramarine-blue must be repeated until the liquid, at a density of 12° Baumé, more or less, and at temperature of, say, 60° Fahrenheit, fails to effect the color of ultramarine-blue, even after many hours' contact. When this point shall have been reached the zinc-alumina solution is to be evaporated (conveniently, but not necessarily, in the same tank in which it has been treated with oxide of zinc) to the density of 48° Baumé, more or less, and then run out upon floors of lead, stone, or other suitable material. Upon cooling there is formed a moist cake. This cake is to be removed by shovel or other convenient means, and exposed for some days to the action of the air, or in an artificially-heated drying-room, until sufficiently hard to be conveniently reduced by a mill or other machine to a coarse powder. Subsequently the material is packed in barrels for use, or further dried at an artificial temperature to expel more moisture, and thereby increase the percentage of sulphate of alumina.

Having thus described my invention, I claim—

The process for the production of a neutral compound, consisting, essentially, of sulphate of alumina and zinc, for paper-makers' use, by treating a solution of sulphate of alumina with oxide of zinc, as described.

In testimony whereof I have hereunto set my hand this 24th day of May, A. D. 1879.

R. A. FISHER.

Witnesses:
W. C. STRAWBRIDGE,
J. BONSALL TAYLOR.